United States Patent
Dalson et al.

[15] 3,676,329
[45] July 11, 1972

[54] REFORMING WITH FOUR OR FIVE PLATINUM RHENIUM CATALYST BEDS

[72] Inventors: Milton H. Dalson; William C. Pfefferle, both of c/o Engelhard Minerals & Chemicals Corp., 497 Delancy St., Newark, N.J. 07105

[22] Filed: June 12, 1970

[21] Appl. No.: 45,896

[30] Foreign Application Priority Data

June 20, 1969 Canada...................................054,900

[52] U.S. Cl..............................................208/65, 208/138
[51] Int. Cl..........................................................C10g 35/08
[58] Field of Search....................................208/65, 138, 139

[56] References Cited

UNITED STATES PATENTS

| | | | |
|---|---|---|---|
| 3,392,107 | 7/1968 | Pfefferle | 208/65 |
| 3,415,737 | 12/1968 | Kluksdahl | 208/138 |
| 3,091,584 | 5/1963 | Singer | 208/65 |
| 3,011,965 | 12/1961 | Decker | 208/65 |

*Primary Examiner*—Herbert Levine
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

Naphtha containing 15 to 30 percent naphthenes and 5 to 20 percent aromatics is reformed in a system including four or five serially-arranged reactors in which the catalyst contains platinum and rhenium supported on a porous, solid base such as alumina. Reactor inlet temperatures and space velocities are defined.

3 Claims, No Drawings

REFORMING WITH FOUR OR FIVE PLATINUM RHENIUM CATALYST BEDS

This invention relates to the catalytic reforming of straight run petroleum naphthas which are of low naphthene and aromatic content in order to increase their octane number. The naphthene content of the naphthas is from 15 to 30 percent by weight and the aromatic content is from 5 to 20 percent by weight, with the remainder being paraffins. The catalyst used contains platinum and rhenium supported on a porous, solid base, such as alumina, and is disposed in four or five reactors arranged in series. When four reactors are used, the processing conditions are maintained such that the first two reactors in the series are naphthene dehydrogenation zones and the third and fourth reactors in the series are paraffin dehydrocyclization zones. When five reactors are used, the processing conditions are maintained such that the first two or three reactors in the series are naphthene dehydrogenation zones and the remaining reactors in the series are paraffin dehydrocyclization zones.

It is known in the art to reform straight run petroleum naphthas in order to increase their octane number by passing them at elevated conditions of temperature and pressure in admixture with hydrogen gas into contact with a reforming catalyst. Among the reforming catalysts which have been proposed is platinum and rhenium supported on alumina. When naphthas are reformed, naphthenes are dehydrogenated to aromatics and paraffins are dehydrocyclized to naphthenes and aromatics. Other reactions also take place.

Certain naphthas are known which are difficult to reform to produce reformate of high octane number without aging the catalyst at an excessively rapid rate. Such naphthas are exemplified by naphtha derived from Kuwait crude, and generally contain from 15 to 30 percent by weight of naphthenes and from 5 to 20 percent by weight of aromatics, with the remainder being paraffins. Such naphthas are difficult to reform because of their very low naphthene and aromatic content. The present invention provides a method for reforming such naphthas economically to produce reformate of high octane number with a low rate of catalyst aging.

Still discussing the prior art, it has also been proposed to reform naphtha using a supported platinum catalyst, hydrogen and a plurality of adiabatic, fixed bed reaction zones arranged in series. Each of the plurality (for example, four) of reaction zones has at least one adiabatic, fixed bed catalytic reaction taking place in it and is preceded by at least one heater for heating the hydrocarbon and hydrogen-containing recycle gas being processed. An early portion of the plurality of reaction zones provides at least one naphthene dehydrogenation zone maintained under certain conditions, and a subsequent portion of the plurality of reaction zones defines at least one paraffin dehydrocyclization zone also maintained under certain conditions. Effluent from the last reactor in the series is cooled and passed to a separator from which there is withdrawn liquid reformate and hydrogen-containing gas. Part of this gas is introduced into the first reactor along with fresh feed to be reformed, part of this gas is introduced into the paraffin dehydrocyclization zone along with the effluent from the last reactor in the naphthene dehydrogenation zone, and the remainder of this gas is withdrawn from the reforming system. Reforming in this manner is described in U.S. Pat. No. 3,392,107 to Pfefferle.

The present invention provides an improved process for the catalytic reforming of straight run petroleum naphthas which are of low naphthene and aromatic content, using four or five reactors arranged in series, hydrogen being introduced into the first (initial) reactor in the series and additional hydrogen being introduced into the third reactor in the series in the case that four reactors are in the series, and additional hydrogen being introduced into the third or fourth reactor in the series in the case that five reactors are in the series.

The straight run petroleum naphtha used as the feed is one having a naphthene content of from 15 to 30 percent by weight and an aromatic content of from 5 to 20 percent by weight, with the remainder being paraffins.

The catalyst present in the reactors contains platinum and rhenium supported on a porous, solid base, such as alumina. When such a catalyst is used, the reforming process can be operated with a low rate of catalyst aging to produce reformate of high octane number. In general, the catalyst will contain from 0.1 to 3 percent by weight of platinum and from 0.01 to 5 percent by weight of rhenium. The porous, solid base or carrier for the platinum and rhenium can be any of a large number of materials which have heretofore been used in the art as catalyst supports. Thus, the carrier can be, for example, silicon carbide, charcoal or carbon. Preferably, the carrier is an inorganic oxide. A high surface area inorganic oxide is particularly preferred, for example, an inorganic oxide having a surface area of from 50 to 700 square meters per gram. The carrier can be a natural or a synthetically produced inorganic oxide or combination of inorganic oxides. Acidic inorganic oxide supports which can be used are the naturally occurring aluminum silicates, particularly when acid treated to increase the activity, and the synthetically-produced, cracking supports, such as silica-alumina, silica-zirconia, silica-alumina-zirconia, silica-magnesia, silica-alumina-magnesia, and crystalline zeolitic aluminosilicates. Generally, however, the reforming process of this invention is preferably conducted using catalysts having low cracking activity, that is, catalysts of limited acidity. Hence, preferred carriers are inorganic oxides, such as magnesia and alumina.

A particularly preferred catalytic carrier for the purposes of this invention is alumina. Any of the forms of alumina suitable as a support for reforming catalysts can be used. A particularly desirable alumina is one which is characterized by large pore, high area base structure, essentially composed of gamma alumina modifications resulting from the drying and calcination of a mixture of precursor hydrous alumina phases containing about 65 to 95 percent of trihydrate. The preparation of such alumina is described in U.S. Pat. No. 2,838,444. The alumina base can, if desired, contain from 0.3 to 1.5 percent by weight of halogen, such as chlorine or fluorine, preferably from 0.6 to 0.9 percent by weight. Further details concerning the preparation of platinum-rhenium catalysts are set forth in U.S. Pat. No. 3,415,737 to Kluksdahl.

When the catalyst is initially contacted with the naphtha, the platinum and rhenium are preferably in sulfide form, rather than in the form of free metal. The platinum and rhenium, when in the form of free metal, can easily be sulfided by contacting the catalyst with hydrogen sulfide or dimethyldisulfide until the catalyst no longer absorbs the hydrogen sulfide or dimethyldisulfide. On the other hand, hydrogen sulfide or dimethyldisulfide can be contacted with the catalyst along with the naphtha at the time when the naphtha is initially introduced, in the event that one wishes to initiate the reforming operation with a catalyst in which the platinum and rhenium are in the form of free metal. When the operation is carried out in this manner, the amount of hydrogen sulfide or dimethyl-disulfide introduced is at least about 50 percent, or even at least about 80 percent, of the stoichiometric amount needed to give one atomic weight of sulfur for each atomic weight of total platinum and rhenium in the catalyst. Advantageously, the hydrogen introduced into the reaction system will have admixed with it from about 5 to about 100 parts per million by volume of water vapor, preferably from 15 to 50 parts per million by volume of water vapor.

The reforming process of this invention is carried out in a series of four or five reactors, in each of which a bed of the catalyst is placed. The pressure of the mixture of fresh naphtha feed and hydrogen-containing recycle gas introduced into the first (initial) reactor can vary within the range from 100 to 350 psig.

From two to nine mols of hydrogen per mol of naphtha are introduced into the reforming system as a constituent of the recycle gas. A portion of this hydrogen is introduced into the first reactor. The remainder of this hydrogen is introduced into the third reactor in the case where there are four reactors in the reforming system, and the remainder of this hydrogen is introduced into the third or fourth reactor in the system in the case where there are five reactors in the reforming system. Where there are five reactors, the remainder of the hydrogen can also be introduced into both the third and fourth reactors with the total of the remainder of the hydrogen being introduced into those reactors in any proportion. Preferably, the amount of hydrogen introduced into the first reactor will be between one-third and two-thirds of the total amount of hydrogen introduced into all the reactors.

Where there are four reactors in the reforming system, the temperature of the mixture of hydrocarbon and hydrogen introduced into the first two reactors will be within the range from 800° to 880°F., and the temperature of the mixture introduced into the third and fourth reactors will be within the range from 900° to 1,000°F. Similarly, when there are five reactors, the temperature of the mixture of hydrocarbon and hydrogen introduced into the first two reactors will be within the range from 800° to 880°F., and the temperature of the mixture introduced into the fourth and fifth reactors will be within the range from 900° to 1,000°F. Also, when there are five reactors, the temperature of the mixture of hydrocarbon and hydrogen introduced into the third reactor can be within the range from 800° to 1,000°F.

The space velocity (WHSV, meaning weight units of fresh naphtha feed per weight units of catalyst per hour) will be within the range from 0.5 to 3, based upon the total amount of catalyst present in the four or five reactors. The space velocity in the first reactor will be within the range from 20 to 50, the space velocity in the intermediate reactors (the second and third in the case that there are four reactors, and the second, third and fourth in the case that there are five reactors) will be within the range from 10 to 30, and the space velocity in the terminal reactor (the fourth in the case that there are four reactors, and the fifth in the case that there are five reactors) will be within the range from 1 to 7, all based upon the weight of fresh naphtha feed.

Also, the total feed (fresh naphtha plus hydrogen-containing recycle gas) introduced into the reactors should not contain more than 20 parts per million by weight of sulfur. Where a guard reactor is used before the first reactor containing the platinum-rhenium catalyst in order to remove sulfur, arsenic and nitrogen, the Research octane number neat of the normally liquid product after the guard reactor should not exceed 70.

EXAMPLE I

The naphtha feed is one obtained from Kuwait crude, has a gravity of 54.0° API, and has an initial boiling point of 240°F. and an end point of 355°F., both ASTM. The naphtha contains 19 percent by weight of naphthenes, 15 percent by weight of aromatics and 66 percent by weight of paraffins.

The catalyst used contains 0.6 percent by weight of platinum and 0.6 percent by weight of rhenium on an alumina base prepared in accordance with the teachings of U.S. Pat. No. 2,838,444 to Teter, Gring and Keith. The base is composed of about 9 percent by weight of amorphous alumina, about 10 percent by weight of boehmite, about 28 percent by weight of bayerite, and about 53 percent by weight of nordstrandite plus gibbsite, and contains about 0.75 percent by weight of chloride. The catalyst is presulfided by passing through it at 750°F. and 100 psig a mixture composed of 99 percent by weight of hydrogen and 1 percent by weight of hydrogen sulfide. The mixture of hydrogen and hydrogen sulfide is passed through the catalyst until one atom of sulfur has been supplied for each atom of platinum and each atom of rhenium in the catalyst.

The catalyst is disposed in four reactors which are arranged in series. The reaction system also includes four furnaces, one being located before the first reactor, the second being located between the first and second reactors, the third being located between the second and third reactors, and the fourth being located between the third and fourth reactors. The weight hourly space velocity, based upon the total naphtha feed and the total weight of catalyst in the four reactors, is 2. The weight hourly space velocity in the first reactor, based upon naphtha feed, is 25. The weight hourly space velocity in the second reactor, based upon naphtha feed, is 20; the weight hourly space velocity in the third reactor, based upon naphtha feed, is 20; and the weight hourly space velocity in the fourth reactor, based upon naphtha feed, is about 2.8.

The reaction system also includes a cooler and a separator after the fourth reactor in which the effluent from the fourth reactor is cooled and separated into a gaseous fraction containing hydrogen and some normally gaseous hydrocarbons (chiefly methane) and liquid reformate. A portion of the gaseous fraction is recycled to the first reactor in amount such that three mols of hydrogen are introduced into the first reactor in admixture with the fresh naphtha feed to be reformed. Similarly, a second portion of the gaseous fraction is recycled to the third reactor in the amount of three mols of hydrogen per mol of fresh naphtha feed introduced into the first reactor. The remainder of the gaseous fraction is withdrawn from the reforming system.

As has been stated, the reforming system is provided with four furnaces, one being located before each reactor. By means of these furnaces, the reaction mixture introduced into the first and second reactors is maintained at 840°F., and the temperature of the reaction mixture introduced into the third and fourth reactors is maintained at 950°F.

The inlet pressure to the first reactor is 200 psig. The total feed, including naphtha and gas recycled to the first and third reactors, contains 10 ppm of sulfur by weight. The hydrogen-containing gas recycled to the first and third reactors includes 35 ppm of water vapor by volume. When the operation is carried out in this manner, there is produced a liquid reformate having a Research octane number neat of about 93.

EXAMPLE II

The naphtha feed and the catalyst are the same as in Example I, and the catalyst is presulfided in the same way.

The catalyst is disposed in five reactors which are arranged in series. The reaction system also includes five furnaces, one being located before the first reactor, the second being located between the first and second reactors, the third being located between the second and third reactors, the fourth being located between the third and fourth reactors, and the fifth being located between the fourth and fifth reactors. The weight hourly space velocity, based upon the total naphtha feed and the total weight of catalyst in the five reactors, is 2. The weight hourly space velocity in the first reactor, based upon naphtha feed, is 25. The weight hourly space velocity in the second reactor, based upon naphtha feed, is 20; the weight hourly space velocity in the third reactor, based upon naphtha feed, is 20; the weight hourly space velocity in the fourth reactor, based upon naphtha feed, is 20; and the weight hourly space velocity in the fifth reactor, based upon naphtha feed, is about 3.2.

The reaction system also includes a cooler and a separator after the fifth reactor in which the effluent from the fifth reactor is cooled and separated into a gaseous fraction containing hydrogen and some normally gaseous hydrocarbons (chiefly methane) and liquid reformate. A portion of the gaseous fraction is recycled to the first reactor in amount such that three mols of hydrogen are introduced into the first reactor in admixture with the fresh naphtha feed to be reformed. Similarly, a second portion of the gaseous fraction is recycled to the third reactor in the amount of three mols of hydrogen per mol of fresh naphtha feed introduced into the first reactor. The remainder of the gaseous fraction is withdrawn from the reforming system.

As has been stated, the reforming system is provided with five furnaces, one being located before each reactor. By means of these furnaces the reaction mixture introduced into the first and second reactors is maintained at 840°F., and the temperature of the reaction mixture introduced into the third, fourth and fifth reactors is maintained at 950°F.

The inlet pressure to the first reactor is 200 psig. The total feed, including naphtha and gas recycled to the first and third reactors, contains 10 ppm of sulfur by weight. The hydrogen-containing recycle gas recycled to the first and third reactors includes 35 ppm of water vapor by volume. When the operation is carried out in this manner, there is produced a liquid reformate having a Research octane number neat of about 95.

It is claimed;

1. A process of reforming a straight run petroleum naphtha containing from 15 to 30 percent by weight of naphthenes and from 5 to 20 percent by weight of aromatics, with the remainder being paraffins, which comprises passing the naphtha in admixture with hydrogen into contact with four or five beds of catalyst containing from 0.1 to 3 percent by weight of platinum and from 0.01 to 5 percent by weight of rhenium supported on a porous, solid base disposed in four or five beds arranged in series: the inlet temperature to the first two beds being within the range from 800° to 880°F., the inlet temperature to the last two beds being within the range from 900° to 1,000°F., and the inlet temperature to the middle bed, in the case that there are five reactors, being within the range from 800° to 1,000°F.; the inlet pressure to the first bed being within the range from 150 to 350 psig; the weight hourly space velocity, based upon naphtha feed and the total amount of catalyst present in the four or five beds, being within the range from 0.5 to 3; the weight hourly space velocity in the first bed, based upon naphtha feed, being within the range from 20 to 50; the weight hourly space velocity in the terminal bed, based upon naphtha feed, being within the range from 1 to 7; the weight hourly space velocity in the remaining beds, based upon naphtha feed, being within the range from 10 to 30; the total amount of hydrogen introduced into the reforming process being within the range from 2 to 9 mols, based upon the mols of fresh naphtha feed; a portion of such hydrogen being introduced into the first bed and the remainder of such hydrogen being introduced into the third bed in the case where there are four beds and into the third or fourth bed or both of them in the case that there are five beds; and the sulfur content of the total feed to the beds being not more than 20 parts per million by weight.

2. The process of claim 1 wherein said porous, solid base is alumina.

3. The process of claim 1 wherein between one-third and two-thirds of the total amount of hydrogen introduced into all the beds is introduced into the first bed.

* * * * *